United States Patent
Waisanen

(10) Patent No.: US 9,653,189 B2
(45) Date of Patent: May 16, 2017

(54) CANISTER TRANSFER SYSTEM WITH INDEPENDENT TRAVELING SHIELDED BELL

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 1984 days.

(21) Appl. No.: 12/257,750

(22) Filed: Oct. 24, 2008

(65) Prior Publication Data
US 2009/0123255 A1     May 14, 2009

Related U.S. Application Data

(60) Provisional application No. 60/982,628, filed on Oct. 25, 2007.

(51) Int. Cl.
*G21C 19/32* (2006.01)
*G21F 5/14* (2006.01)
*B66C 17/00* (2006.01)
*G21C 19/02* (2006.01)

(52) U.S. Cl.
CPC ............. *G21F 5/14* (2013.01); *B66C 17/00* (2013.01); *G21C 19/02* (2013.01); *G21C 19/32* (2013.01)

(58) Field of Classification Search
CPC .... G21Y 2002/00; G21C 19/02; G21C 19/32; G21C 19/00; G21C 19/20; G21C 19/34; G21C 19/18; G21F 5/14; G21F 7/067; G21F 5/005
USPC ....... 376/272, 260, 268, 264, 269, 270, 271; 250/506.1, 507.1; 212/209–213, 224; 414/146
See application file for complete search history.

(56) References Cited

U.S. PATENT DOCUMENTS

| | | | | |
|---|---|---|---|---|
| 3,863,770 A | * | 2/1975 | Shallenberger | G21C 19/32 376/271 |
| 4,311,557 A | * | 1/1982 | Kowalski et al. | 376/271 |
| 4,599,518 A | * | 7/1986 | Schmidt | G21F 5/14 250/507.1 |
| 4,664,873 A | * | 5/1987 | Hendrich et al. | 376/260 |
| 5,369,676 A | * | 11/1994 | Ortega et al. | 376/271 |
| 6,359,953 B1 | * | 3/2002 | Faser | G21C 19/32 376/271 |

(Continued)

FOREIGN PATENT DOCUMENTS

JP     6-258487     *  9/1994   ............ G21C 19/32

OTHER PUBLICATIONS

Hoist Magazine, Bottom Block for Crane to Handle Nuclear Fuel, Oct. 15, 2008, Pivoting trunnions and paddles.*

*Primary Examiner* — Jack W Keith
*Assistant Examiner* — Daniel Wasil
(74) *Attorney, Agent, or Firm* — Porter, Wright, Morris & Arthur, LLP

(57) ABSTRACT

A transfer system for spent fuel canisters includes a carrier, a shielded bell trolley movable along the carrier and carrying a shielded bell, and a canister trolley movable along the carrier and carrying a lifting mechanism for raising and lowering the spent fuel canister into and out of the shielded bell. The canister trolley can move along the carrier independent of the shielded bell trolley and the shielded bell trolley can move along the carrier independent of the canister trolley. The shielded bell trolley and the canister trolley can be selectively interlocked for selected transfer operations.

18 Claims, 8 Drawing Sheets

(56) References Cited

U.S. PATENT DOCUMENTS

| | | | |
|---|---|---|---|
| 6,530,492 B2 * | 3/2003 | Weis | 212/316 |
| 6,538,259 B2 * | 3/2003 | Matsunaga et al. | 250/506.1 |
| 6,674,828 B1 * | 1/2004 | Weber et al. | 376/272 |
| 6,788,755 B2 * | 9/2004 | Weber et al. | 376/262 |
| H2178 H * | 2/2007 | Rivera et al. | 212/316 |
| 2002/0031419 A1 | 3/2002 | Weis | |
| 2003/0231733 A1 | 12/2003 | Weber et al. | |
| 2005/0258015 A1 | 11/2005 | Kinzer | |

* cited by examiner

CANISTER TRANSFER SYSTEM WITH INDEPENDENT TRAVELING SHIELDED BELL

CROSS-REFERENCE TO RELATED APPLICATIONS

This application claims the priority benefit of U.S. Provisional Patent Application No. 60/982,628 filed on Oct. 25, 2007, the disclosure of which is expressly incorporated herein it its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to overhead hoist or crane systems and, more particularly, to such systems for transporting canisters of spent nuclear fuel.

BACKGROUND OF THE INVENTION

Spent nuclear fuel is typically transferred in canisters which are moved by overhead hoist or crane systems. For example, see U.S. Pat. Nos. 6,674,828 and 6,788,755, the disclosures of which are expressly incorporated herein in their entireties by reference. The spent nuclear fuel remains highly radioactive and is capable of generating significant thermal energy. Therefore, the canisters are typically transferred within a shielded bell.

While prior hoist systems may adequately transfer the spent fuel canisters, they can be rather complex and expensive to produce and operate. The hoists must have a relatively high rating because it must raise both the spent fuel canister and the shield bell at the same time. For example, a hoist may need to be rated for 200 tons when the maximum weight of the spent fuel container is only 70 tons. Additionally, the hoist must have the ability to automate and have accurate reliable positioning to engage and manipulate the spend fuel canister. Accordingly, there is a need in the art for an improved system and method for transporting canisters of spent nuclear fuel.

SUMMARY OF THE INVENTION

The present invention provides a system and method for transporting canisters of spent nuclear fuel that solve at least problem of the related art. According to one embodiment of the present invention, a transfer system for moving a spent fuel canister comprises, in combination, a carrier, a shielded bell trolley movable along the carrier and carrying a shielded bell, and a canister trolley movable along the carrier and carrying a lifting mechanism for raising and lowering the spent fuel canister into and out of the shielded bell. The canister trolley can move along the carrier independent of the shielded bell trolley.

According to another embodiment of the present invention, a transfer system for moving a spent fuel canister comprises, in combination, a carrier, a shielded bell trolley movable along the carrier and carrying a shielded bell, and a canister trolley movable along the carrier and carrying a lifting mechanism for raising and lowering the spent fuel canister into and out of the shielded bell. The carrier directly supports the shielded bell trolley so that the lifting mechanism does not support the shielded bell.

According to yet another embodiment of the present invention, a transfer system for moving a spent fuel canister comprises, in combination, a bridge, a shielded bell trolley movable along the bridge and carrying a shielded bell, and a canister trolley movable along the bridge and carrying a hoist for raising and lowering the spent fuel canister into and out of the shielded bell. The bridge includes a first pair of spaced-apart rails for supporting the canister trolley and a second pair of spaced-apart rails for supporting the shielded bell trolley. The first pair of spaced-apart rails is substantially parallel to the second pair of spaced-apart rails. The bridge is movable along a third pair of spaced-apart rails substantially perpendicular to the first pair of spaced-apart rails and the second pair of spaced-apart rails. The canister trolley can move along the bridge independent of the shielded bell trolley and the shielded bell trolley can move along the bridge independent of the canister trolley.

From the foregoing disclosure and the following more detailed description of various preferred embodiments it will be apparent to those skilled in the art that the present invention provides a significant advance in the technology of system and method for transporting canisters of spent nuclear fuel. Particularly, the invention provides a relatively low cost system which meets performance requirements. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
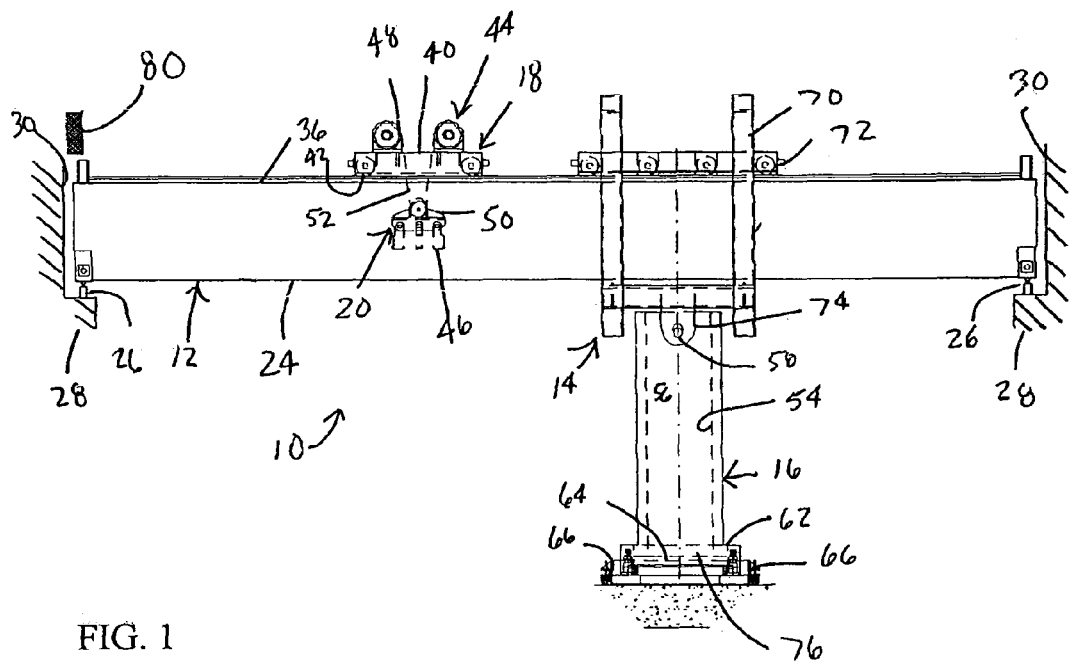
FIG. 1 is a front elevational view of a canister transfer system according a preferred embodiment of the present invention.

It should be understood that the appended drawings are not necessarily to scale, presenting a somewhat simplified representation of various preferred features illustrative of the basic principles of the invention. The specific design features of the canister transfer systems as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the transfer systems illustrated in the drawings. In general, up or upward refers to an upward direction generally in the plane of the paper in FIG. 1 and down or downward refers to a downward direction generally in the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the transfer systems and methods disclosed herein. The following detailed discussion of various alternative and preferred embodiments will illustrate the general principles of the invention with reference to a transfer system for spent nuclear fuel canisters. Other embodiments suitable for other applications will be apparent to those skilled in the art given the benefit of this disclosure.

Figure 2:
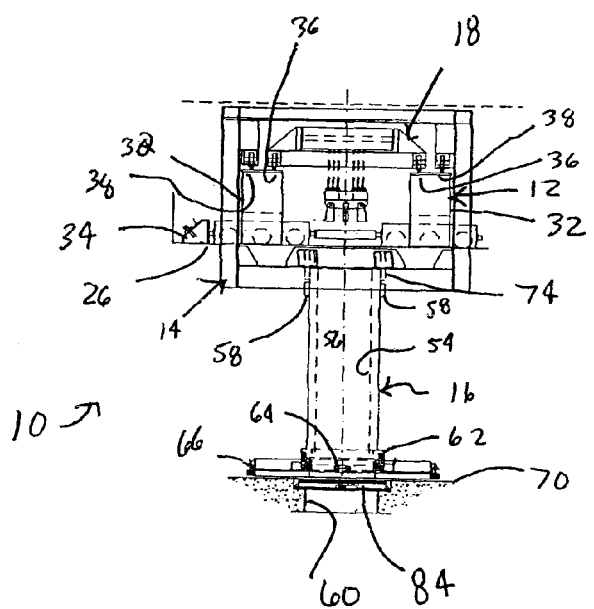
FIG. 2 is an end elevational view of the canister transfer system of FIG. 1.
Figure 9:
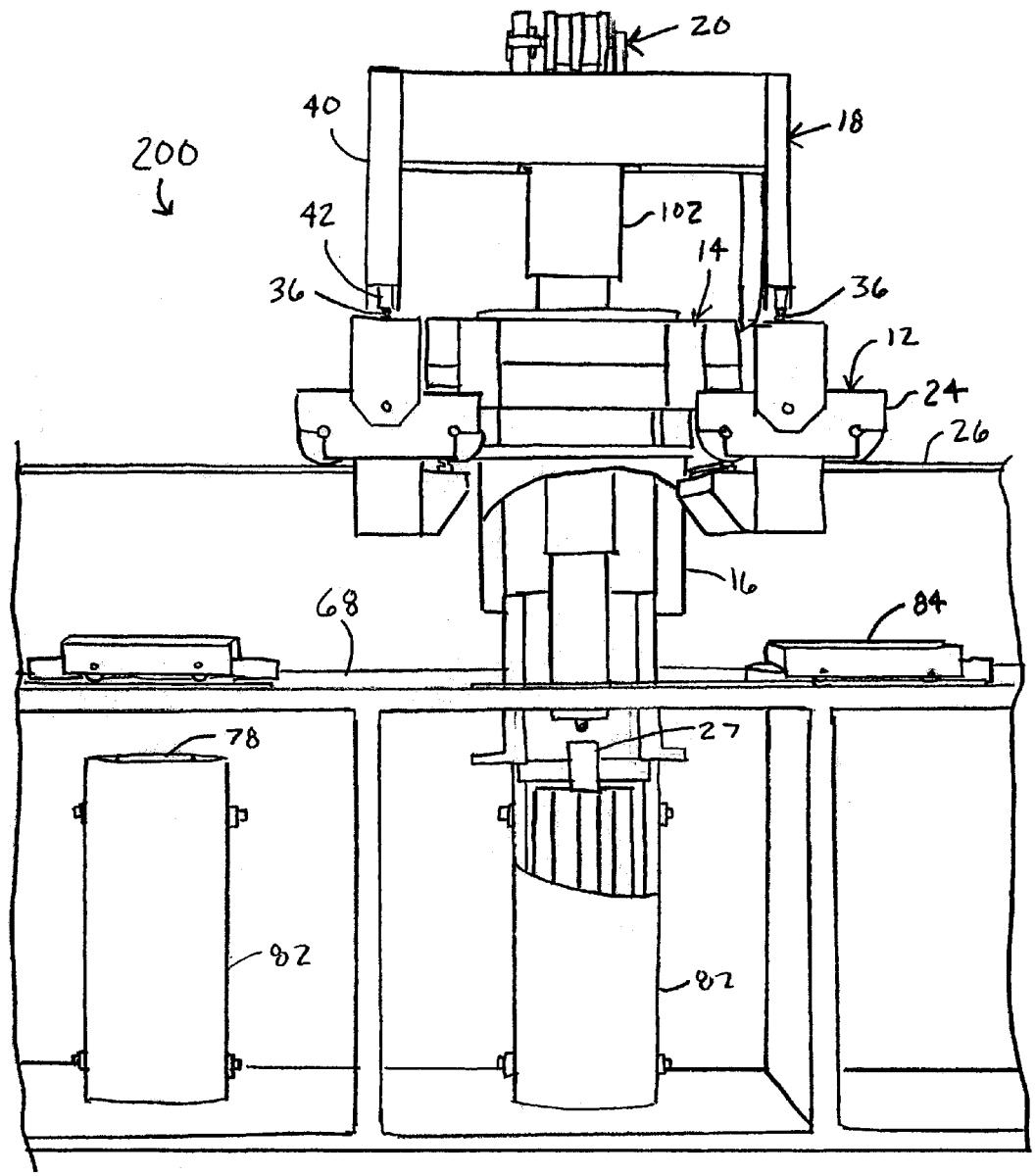
FIG. 9 is an end elevational view of the canister transfer system of FIGS. 6 to 8.

Referring now to the drawings, FIGS. 1 and 2 shows a canister transfer system 10 according to a preferred embodiment of the present invention. The operating envelope of the illustrated canister transfer system 10 provides coverage of a transportation cask transfer cell, waste package transfer cell, canister staging cells, and transfer system maintenance/staging area. The illustrated canister transfer system 10 includes a carrier 12, a first or shielded bell trolley 14 movable along the carrier 12 and carrying a shielded bell 16, and a second or canister trolley 18 movable along the carrier 12 and carrying a lifting mechanism 20 for raising and lowering the spent fuel canister 22 (see FIG. 9) into and out of the shielded bell 16.

The illustrated canister transfer system 10 is in the form of a bridge crane, wherein the carrier 12 in the form of a bridge 24. It is noted that the canister transfer system 10 can alternatively have any other suitable form and/or the carrier 12 can alternatively have any other suitable form. The illustrated bridge 24 includes end trucks riding on a pair of laterally spaced apart and parallel rails 26. The illustrated rails 26 are straight but it is noted that any other suitable configuration for the rails 26 can be utilized. The illustrated rails 26 supported by corbels 28 located on laterally spaced-apart walls 30. It is noted that any other suitable supports for the rails 26 can alternatively be utilized. The distance between the rails 26 can be any suitable distance such as, for example, about eighty six feet.

The illustrated bridge 24 is formed by box frame girders 32. Girder plates are preferably continuous welded for maximum strength, stiffness, and torsional stability but can alternatively be constructed in any other suitable manner. Bumpers 34 are provided at the ends of the rails 26 which are designed to minimize impact to the canisters 22 being transferred. Each bridge girder 32 supports the two trolleys 14, 18. A first or inner pair of rails 36 is provided for the canister trolley 18 and a second or outer pair of rails 38 is provided for the shielded bell trolley 14. The rails 36, 38 are preferably fastened to the girders 32 with welded clips but can alternatively be secured in any other suitable manner. The rails 36, 38 are mounted on top of the girders 32 so that the bridge 24 directly and independently supports each of the two trolleys 14, 18. The illustrated first pair of spaced-apart rails 36 is substantially parallel to the second pair of spaced-apart rails 38. The illustrated first and second pairs of rails 36, 38 extend in the lateral direction, that is along the longitudinal length of the bridge 24, such that the first and second pairs of rails 36, 38 are substantially perpendicular to the rails 26 for the bridge 24. The illustrated first and second pairs of rails 36, 38 are each straight but it is noted that any other suitable configuration for the rails 36, 38 can be utilized. The illustrated first and second pairs of rails 36, 38 are located at the same height but can alternatively be located at other heights as described in more detail hereinafter.

The canister or main hoist trolley 18 includes a frame or body 40 having a plurality of wheels 42 which cooperate with the rails 36 so that the canister trolley 18 can be selectively moved along the rails 36. The canister trolley 18 can have any suitable type of drive mechanism for the wheels 42 such as, for example, an electric motor. The illustrated canister trolley 18 rides on the inner rails 36 of the bridge 24 and is preferably provided with seismic restraints.

The canister trolley 18 also includes the lifting mechanism 20 for performing various transfer operations including raising and lowering the canisters 22. The illustrated lifting mechanism 20 is a crane or hoist system 44 having a remote grapple attachment or system 46. It is noted that any other suitable type of lifting mechanism 20 can alternatively be utilized. The crane or hoist 44 preferably utilizes failure proof technology. The illustrated hoist 44 includes an upper block assembly 48 and a lower block assembly 50 that is suspended from the upper block assembly 52 by a reeving arrangement 52. Operation of an electric motor raises and lowers the lower block 50. Secured to the lower block assembly 50 is the grapple attachment 46 which is adapted to interact with the shielded bell 16 and the canisters 22 as described in more detail hereinafter. The remotely operated grapple attachment 46 preferably utilizes limit switches to verify grapple engagement. The grapple attachment 46 preferably utilizes a mechanism that includes a mechanical safe drive that will not allow the grapple attachment 46 to disengage when a load is suspended from the grapple attachment 46. The canister trolley 18 can have any suitable hoisting capacity such as, for example, seventy tons. Electrical power to the canister trolley 18 is provided through hard-wired connections using a cable track system.

The illustrated shielded bell 16 is generally cylindrical shaped and has an inner wall 54 which forms an interior space or main shielding chamber 56. The illustrated shielded bell 16 has a pair of opposed lifting lugs or trunnions 58 near its top end which are used by the trolley 14 to hold the shielded bell 16. The shielded bell 16 be can have any suitable size such as, for example, a height of about twenty-five feet, an outside diameter of about ninety-four inches, and an inside diameter of about seventy two inches. The shielded bell 16 can be formed of any suitable material such as, for example, steel and preferably reduces radiation exposure to operating personnel by limiting the contact dose rate (exterior of the shielded bell 16) to about one hundred mrems/hr. The total weight of the shielded bell 16 supported by the shielded bell trolley 14 can be, for example, about two hundred tons.

The bottom end of the illustrated shielded bell 16 can be attached to a chamber 60 to accommodate cask lids having diameters of, for example, up to eighty-four inches. A bottom plate 62 with an opening can be attached to the chamber to support a motorized shield gate 64. The bottom plate 62 can have a thickness of, for example, about nine inches and the opening can have a diameter of, for example, about eighty six inches. The shield gate 64 can have a thickness of, for example, about twelve inches. The sliding shield gate 64 provides bottom shielding for the canister 22 once the canister 22 is inside the shielded bell 16. A shielded skirt 66 is provided around the perimeter of the bottom plate 62 which can be raised and lowered with the help of mechanical actuators. The shield skirt 66 is used to close any gap between the bottom plate 62 and a floor surface 68 to prevent any lateral radiation shine during a canister transfer operation. The shielded skirt 66 can have a thickness of, for example, about nine inches. The bottom plate 62 can preferably be located about two inches above the concrete floor 68 where canister transfer ports are located.

The shielded bell trolley 14 supports the shielded bell 16 and includes a frame of body 70 having a plurality of wheels 72 which cooperate with the rails 38 so that the shielded bell trolley 14 can be selectively moved along the rails 38. The shielded bell trolley 14 can have any suitable type of drive mechanism for the wheels 72 such as, for example, an electric motor. Electrical power to the shielded bell trolley 14 is provided through hard-wired connections using a cable track system. The shielded bell trolley 14 also includes grapple means 74 for interacting with the shielded bell 16. The illustrated grapple means 74 is in the form of a pair of paddles secured directly to the trolley frame 70. The paddles 74 include openings for receiving the trunnions 58 of the shielded bell 16. It is noted that the grapple means 74 can alternatively be of any suitable type. It is also noted that if desired the shielded bell trolley 14 can alternatively include a crane or hoist such as that described in U.S. patent application Ser. No. 11/839,797, the disclosure of which is expressly incorporated herein in its entirety by reference.

The illustrated shielded bell trolley 14 rides on the outer rails 38 and supports the shielded bell 16 which includes the main shielding chamber 60 for shielding canisters 22, a lower larger chamber 76 for accommodating cask lids 78, and the slide gate 64 for providing bottom shielding for canisters 22 when inside the shielded chamber 60. The shielded bell trolley 14 carries the entire load of the shielded bell 16 and the bridge 24 directly supports the shielded bell trolley 14 so that the hoist system 44 of the canister trolley 18 is never required to support the shielded bell 16. The load path for the shielded bell 16 does not pass through the hoist system 44 or the canister trolley 18. This enables the hoist system 44 of the canister trolley 18 to be sized smaller than if it must carry the load of the shielded bell 16. For example, a seventy ton hoist 44 can be utilized when the shielded bell 16 weighs about two hundred tons or more. The shielded bell trolley 14 is preferably provided with seismic restraints. The trunnion-type attachment of the shielded bell 16 to the shielded bell trolley 14 preferably forma a swivel type joint to minimize transmission of seismic load to the trolley frame 70.

All hoist, trolley and bridge drive gearing is preferably enclosed in sealed gear boxes, with oil of high flash point such as four hundred degrees Fahrenheit or better, that will not support a flame or fire. Electric power is provided by a crane cable track system 80 located along the runway length and supported by the facility walls 30. The canister trolley 18, the hoist system 44, and the shielded bell trolley 14 are each preferably controlled from a control room with a local control station as a backup. Limit switches, load cells and interlocks are preferably provided for the operation of the two trolleys 14, 18.

The illustrated canister transfer system 10 allows for the two trolleys 14, 18 to move independently of one another when desired and to be selectively interlocked together to operate as a single unit when performing selected canister transfer operations. To mechanically interlock the trolleys 14, 18 together, the canister trolley 18 with the grapple 46 is first positioned concentric with the shielded bell 16, wherein the central axis of the grapple 46 is aligned with the central axis of the shielded bell 16. The two trolleys 14, 18 are mechanically interlocked locked prior to starting a canister transfer operation by lowering the grapple 46 into the shielded bell 16. It is noted that the trolleys 14, 18 can alternatively be mechanically interlocked in any other suitable means.

Figure 3:
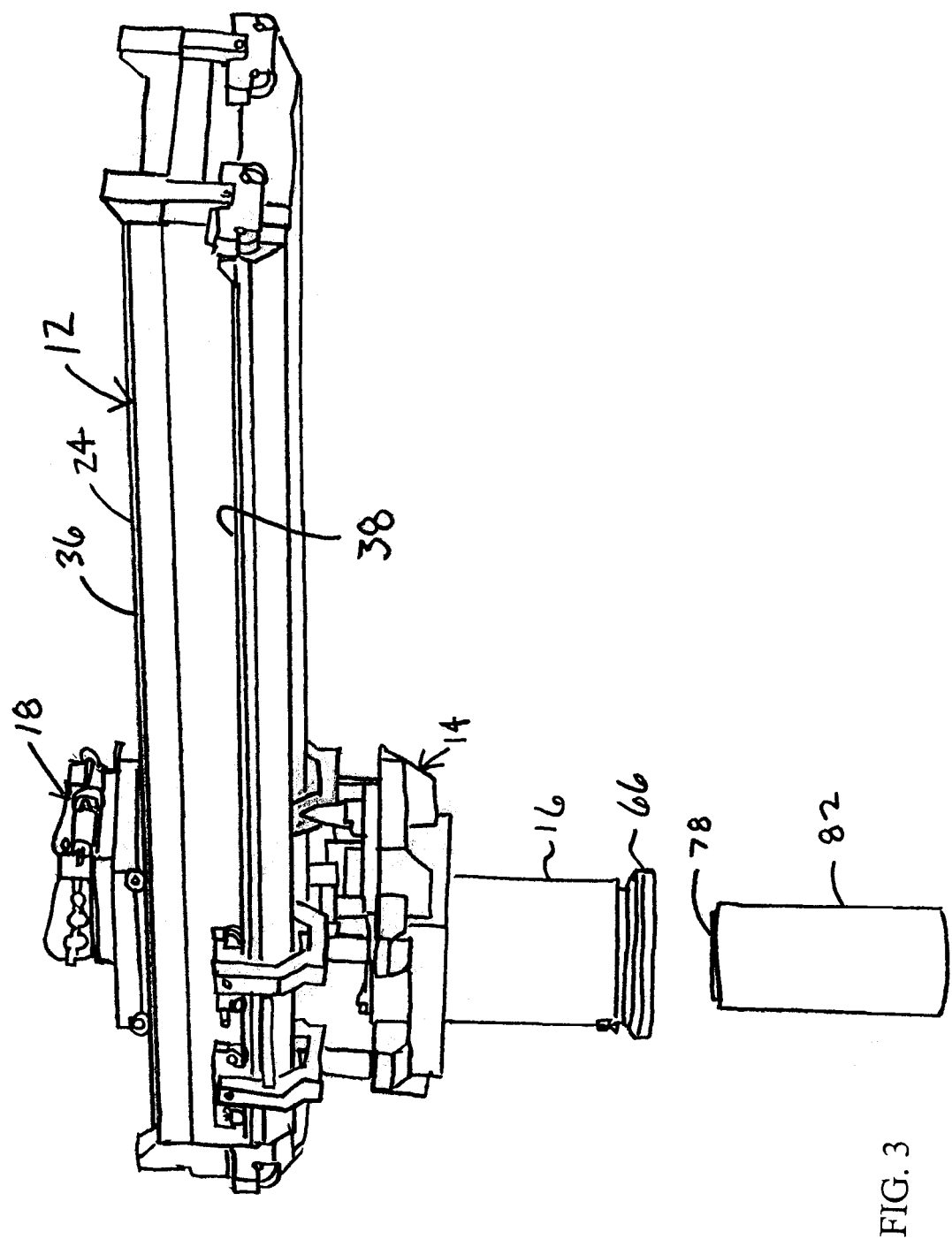
FIG. 3 is a perspective view of a canister transfer system according a second preferred embodiment of the present invention, wherein shielded bell is positioned above storage cask of spent fuel canisters.
Figure 4:
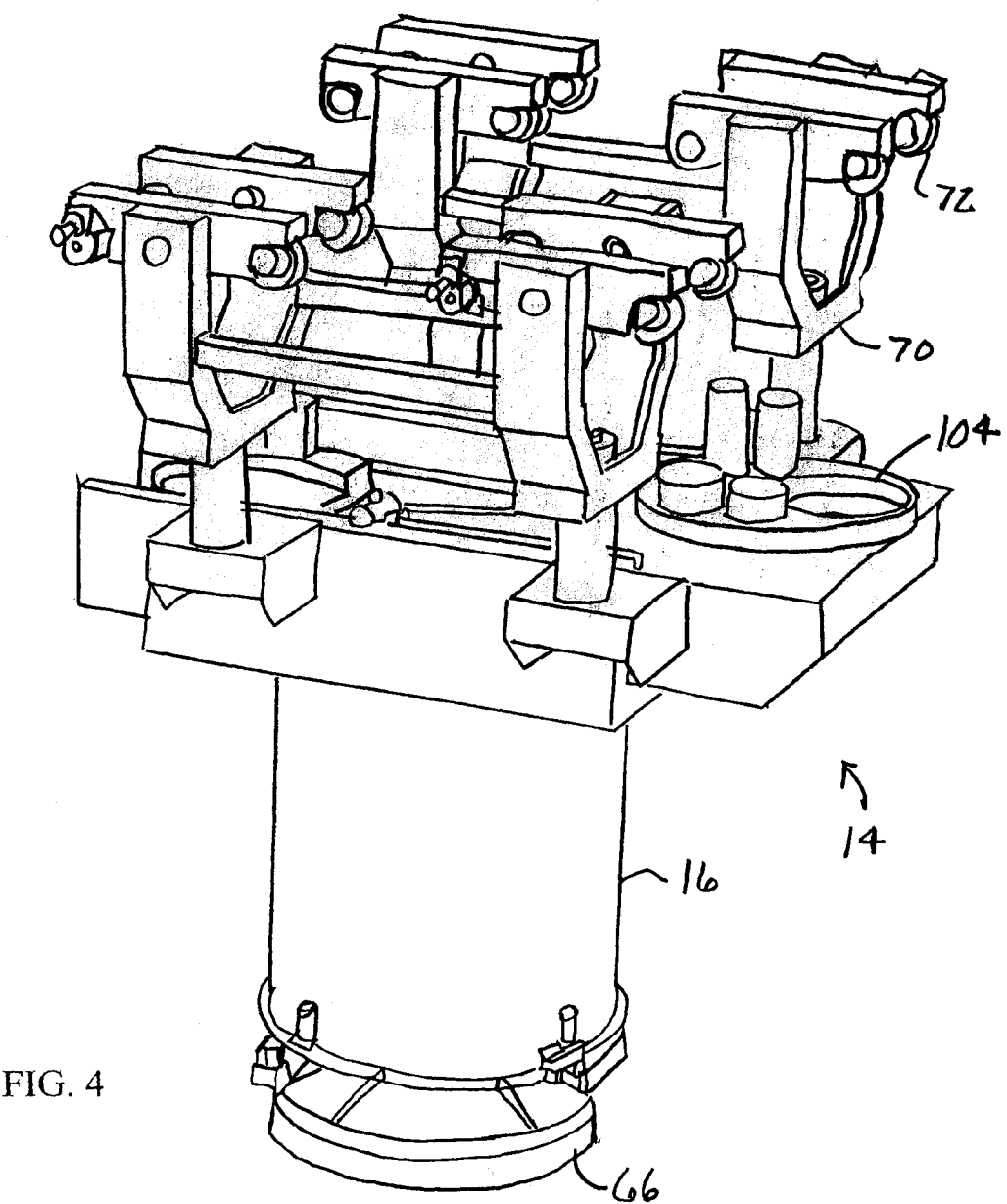
FIG. 4 is a perspective view of a shielded bell trolley of the canister transfer system of FIG. 3.
Figure 5:
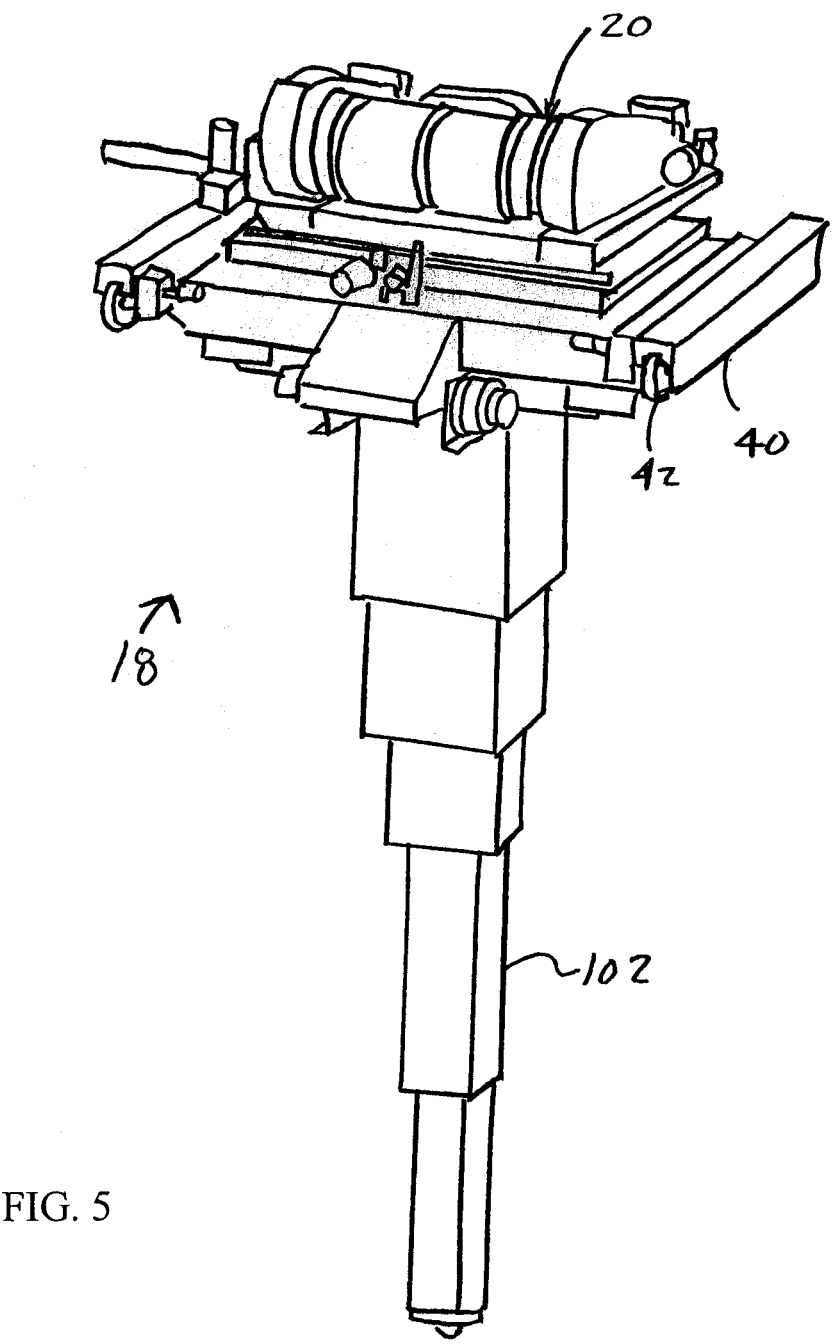
FIG. 5 is a perspective view of a canister trolley of the canister transfer system of FIG. 3.
Figure 6:
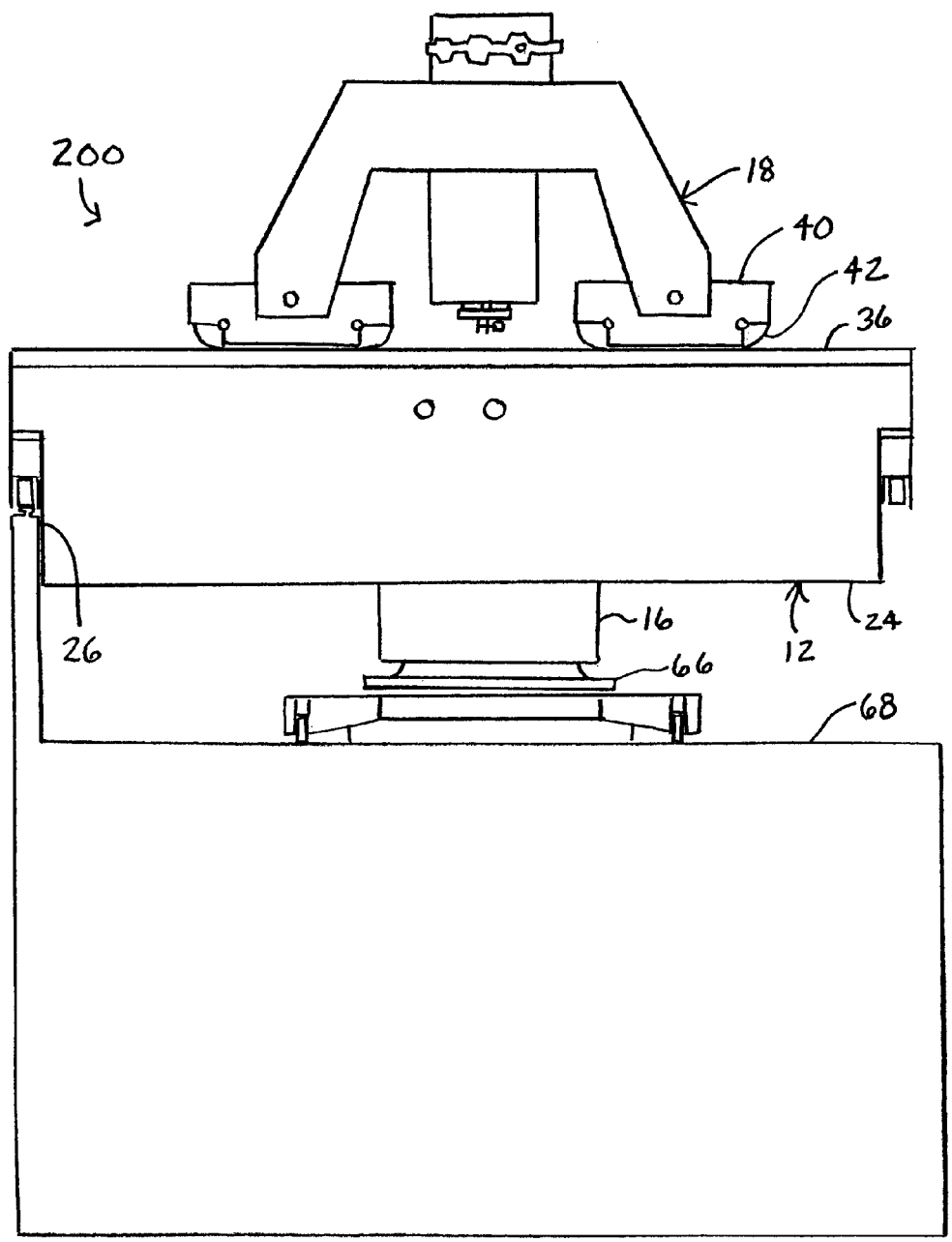
FIG. 6 is a front elevational view of a canister transfer system according a third preferred embodiment of the present invention, wherein shielded bell is positioned above storage cask of spent fuel canisters and a support for a bridge of the canister transfer system is removed for clarity.
Figure 7:
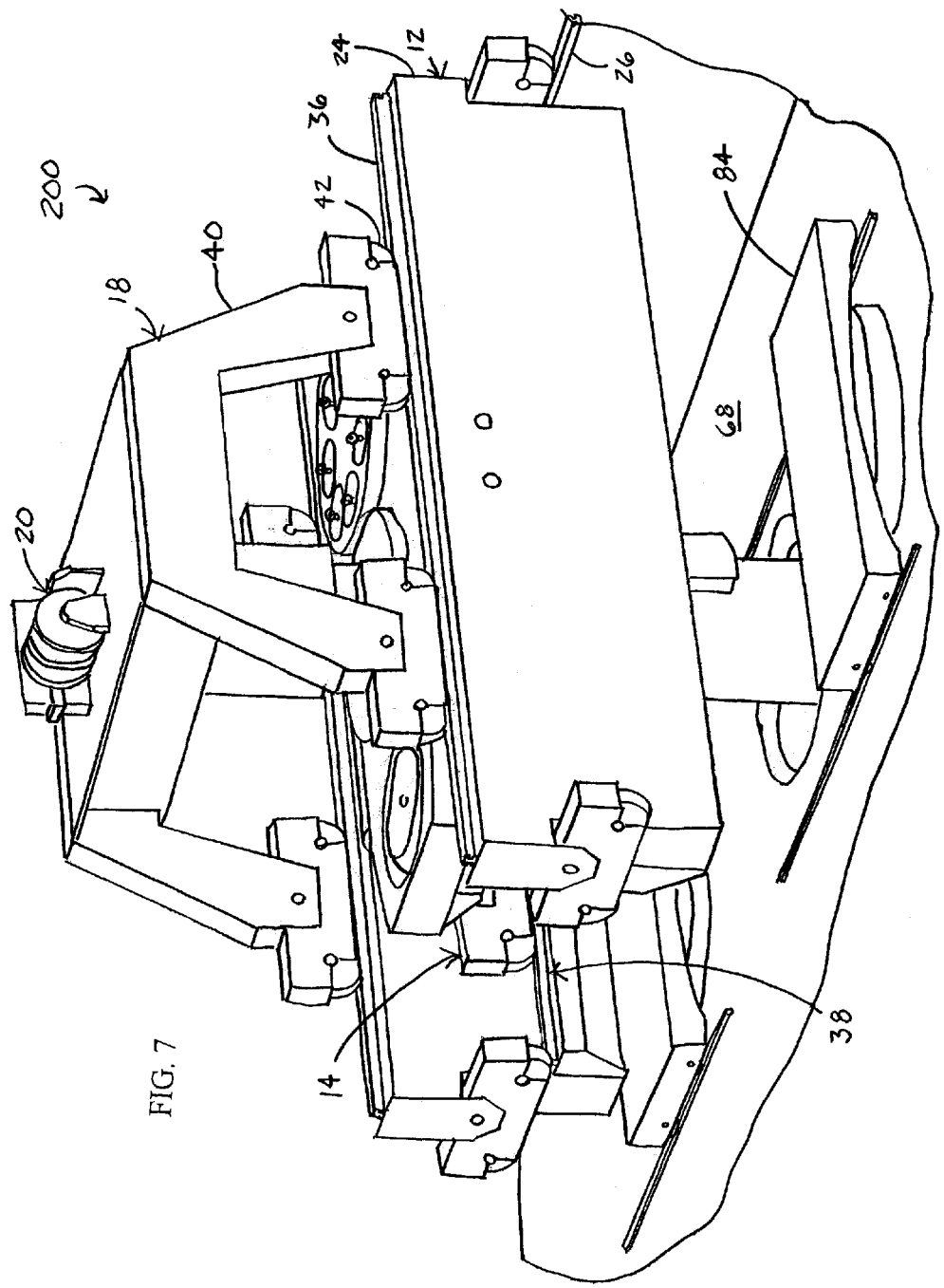
FIG. 7 is a front perspective view of the canister transfer system of FIG. 6.
Figure 8:
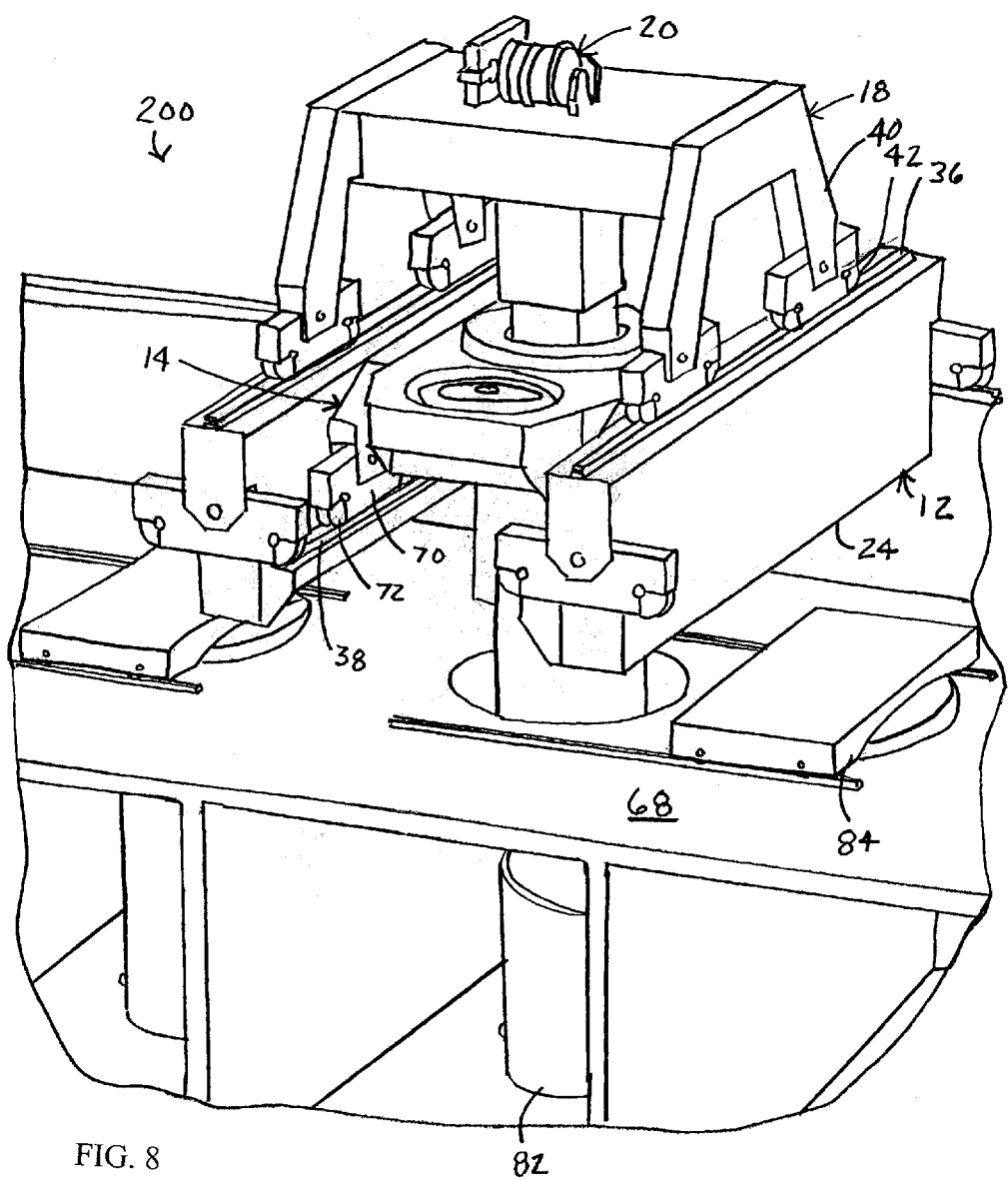
FIG. 8 is an end perspective view of the canister transfer system of FIGS. 6 and 7.

FIGS. 3 to 5 illustrate a canister transfer system 100 according to second embodiment of the present invention. The second embodiment of the canister transfer system 100 illustrates that the shielded bell trolley 14 can be in an under running position. Either an over running or under running configuration can be utilized depending on the total allowable head room for the application. The illustrated rails 38 for the shielded bell trolley 14 are located outward and below the rails 36 for the canister trolley 18. Located above the shielded bell trolley 14 is the canister trolley 18 which operates independently of the shielded bell trolley 14 and has a telescoping mast 102 with a universal nose that can be attached to various tools for the work that needs to be performed. A tool box 104 for the tools can be located at an end of the shielded bell trolley 14.

FIGS. 6 to 9 illustrate a transfer system 200 according to third embodiment of the present invention. The third embodiment of the canister transfer system 200 illustrates that the shielded bell trolley 14 can be located inward of the canister trolley 18. The illustrated rails 38 for the shielded bell trolley 14 are located inward and below the rails 36 for the canister trolley 18. Located above the shielded bell trolley 14 is the canister trolley 18 which operates independently of the shielded bell trolley 14.

A typical canister transfer operation using the canister transfer system 10, 100, 200 includes positioning the shielded bell 16 over a port on a concrete deck or floor 68 with the shielded bell bottom being about two inches above the deck 68. Below the concrete deck 68 is a shielded transfer cell 76 with the port located above a loaded storage cask 82. In a similar manner, an empty waste package is positioned under an adjacent port of the waste package transfer cell. Each port is equipped with a motorized shielded gate and flushed with concrete deck surface.

The transfer operation typically begins by positioning the canister transfer system 10 over the port with the loaded storage cask 82. The shield skirt 66 is remotely lowered to rest on the deck 68 to prevent any lateral radiation shine. The shielded slide gate 84 on the concrete deck 68 is opened to access the cask lid 78 located below. The slide gate 64 of the shielded bell 16 is opened and the grapple 46 is lowered through the shielded bell 16. The grapple 46 is engaged with a mounted lift fixture on the cask lid 78. The cask lid 78 is raised into the larger chamber 78 of the shielded bell 18. The deck slide gate 84 is closed and the shield skirt 66 is raised. The canister transfer system 10 is moved and positioned over a cask lid staging area located on the concrete deck. The cask lid 78 is lowered and placed in the staging area and the grapple 46 is raised. The canister transfer system 10 is moved back over the port with the loaded storage cask below 82, and the canister transfer system 10 is positioned and aligned for canister pickup and the shield skirt 66 of the shielded bell 16 is lowered. The deck slide gate 84 is opened and the grapple 46 is lowered to engage the canister lifting feature. The canister 22 is pulled up into the shielding chamber 56 shielded bell 16. Both the transfer system slide gate 64 and the deck slide gate 84 are closed. The shield skirt 66 of the shielded bell 16 is raised and the canister transfer system 10 is moved over the waste package port for canister loading. The canister transfer system 10 is positioned and aligned with the port and the shield skirt 66 of the shielded bell 16 is lowered. Both the shielded bell and deck slide gates 64, 84 are opened. The canister 22 is lowered and placed into the waste package. The grapple 46 is then disengaged from the canister 22 and removed in a reverse manner.

It is apparent from the foregoing disclosure that the canister trolley 18 can traverse the bridge 24 independently of the shielded bell trolley 14. This permits the canister trolley 18 to travel to and from the tool crib 104 located on the shielded bell trolley 14 to retrieve various tools and grapples required for removing the spent fuel canisters 22 from one storage cask 82 and transferring them to another. The canister trolley 18 is used to lift the canisters 22 as well as handling of tools and lift grapples required to remove and replace the cask lids 78 and to move the spent fuel canisters 22. Additionally, the canister trolley 18 can interlock with the shielded bell trolley 14 so that the canisters 22 can be transferred from one cask 82 to another cask while the shielded bell 16 protects the area from radiation given off by the spent fuel canisters 22. It is also apparent from the above disclosure that the hoist system 44 does not carry the shielded bell 16. Thus the hoist 44 does not have to be rated for more than the capacity of the heaviest spent fuel canister 22 because it does lift or lower the shielded bell 16. It is further apparent from the above disclosure that the canister extraction process can be automated. Leaving the shielded bell 16 in a fixed position and moving the canister trolley 18 with respect to a fixed position enables the canister trolley 18 and the hoist 44 to be very accurate and reliable when the bridge 24 does not have to move. Thus, the canister trolley 18 is isolated from the shielded bell 16 allowing them to move independently without one limiting movement of the other and when necessary the two are linked together to provide the accuracy needed to extract and manipulate spend fuel containers 22.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A bridge crane for moving a spent fuel canister comprising, in combination:
    a pair of stationary spaced-apart rails;
    a bridge selectively movable along the pair of stationary spaced-apart rails;
    a shielded bell trolley movable along the bridge and carrying a shielded bell below the bridge;
    wherein the shielded bell is cylindrical shaped forming an interior space configured for receiving the spent fuel canister therein and comprising a material for reducing radiation exposure of the spent fuel canister outside the shielded bell when the spent fuel canister is in the shielded bell;
    a canister trolley movable along the bridge and carrying a lifting mechanism for raising and lowering the spent fuel canister into and out of the shielded bell located below the bridge;
    wherein the bridge includes a first pair of spaced-apart rails for supporting the canister trolley and a second pair of spaced-apart rails for supporting the shielded bell trolley;
    wherein the canister trolley is configured to selectively move along the bridge relative to the shielded bell trolley, and wherein the lifting mechanism is configured to selectively move relative to the shielded bell trolley and the shielded bell;
    wherein the canister trolley and the shielded bell trolley are configured to selectively move together along the bridge at the same time while the lifting mechanism of the canister trolley supports the spent fuel canister within the shielded bell carried by the shielded bell trolley; and
    wherein the load path of the shielded bell does not pass through the canister trolley and the load path of the shielded bell does not pass through the lifting mechanism.

2. The bridge crane according to claim 1, wherein the shielded bell trolley is configured to selectively move along the bridge relative to the canister trolley.

3. The bridge crane according to claim 1, wherein the first pair of spaced-apart rails is parallel to the second pair of spaced-apart rails.

4. The bridge crane according to claim 3, wherein the stationary spaced-apart rails are perpendicular to the first pair of spaced-apart rails and the second pair of spaced-apart rails.

5. The bridge crane according to claim 1, wherein the lifting mechanism is a hoist.

6. The bridge crane according to claim 1, wherein the bridge directly supports the shielded bell trolley so that the lifting mechanism does not support the shielded bell.

7. The bridge crane according to claim 1, wherein the shielded bell trolley includes paddles receiving trunnions of the shielded bell to support the shielded bell.

8. The bridge crane according to claim 1, wherein the lifting mechanism includes a remote grapple attachment configured for selectively interlocking with the shielded bell.

9. A bridge crane for moving a spent fuel canister comprising, in combination:
    a pair of stationary spaced-apart rails;
    a bridge selectively movable along the pair of stationary spaced-apart rails;
    a shielded bell trolley movable along the bridge and carrying a shielded bell below the bridge;
    wherein the shielded bell is cylindrical shaped forming an interior space configured for receiving the spent fuel canister therein and comprising a material for reducing radiation exposure of the spent fuel canister outside the shielded bell when the spent fuel canister is in the shielded bell;

a canister trolley movable along the bridge and carrying a lifting mechanism for raising and lowering the spent fuel canister into and out of the shielded bell located below the bridge;

wherein the bridge includes a first pair of spaced-apart rails for supporting the canister trolley and a second pair of spaced-apart rails for supporting the shielded bell trolley;

wherein the bridge directly supports the shielded bell trolley so that the lifting mechanism does not support the shielded bell;

wherein the canister trolley and the lifting mechanism are configured to selectively move relative to the shielded bell trolley and the shielded bell;

wherein the canister trolley and the shielded bell trolley are configured to selectively move together along the bridge at the same time while the lifting mechanism of the canister trolley supports the spent fuel canister within the shielded bell carried by the shielded bell trolley; and wherein the load path of the shielded bell does not pass through the canister trolley and the load path of the shielded bell does not pass through the lifting mechanism.

10. The bridge crane according to claim 9, wherein the shielded bell trolley is configured to selectively move along the bridge relative to the canister trolley.

11. The bridge crane according to claim 9, wherein the first pair of spaced-apart rails is parallel to the second pair of spaced-apart rails.

12. The bridge crane according to claim 11, wherein the stationary spaced-apart rails are perpendicular to the first pair of spaced-apart rails and the second pair of spaced-apart rails.

13. The bridge crane according to claim 9, wherein the lifting mechanism is a hoist.

14. The bridge crane according to claim 9, wherein the shielded bell trolley includes paddles receiving trunnions of the shielded bell to support the shielded bell.

15. The bridge crane according to claim 9, wherein the lifting mechanism includes a remote grapple attachment configured for selectively interlocking with the shielded bell.

16. A bridge crane for moving a spent fuel canister comprising, in combination:

a pair of stationary spaced-apart rails;

a bridge selectively movable along the pair of stationary spaced-apart rails;

a shielded bell trolley movable along the bridge and carrying a shielded bell located below the bridge;

wherein the shielded bell is cylindrical shaped forming an interior space configured for receiving the spent fuel canister therein and comprising a material for reducing radiation exposure of the spent fuel canister outside the shielded bell when the spent fuel canister is in the shielded bell;

a canister trolley movable along the bridge and carrying a hoist for raising and lowering the spent fuel canister into and out of the shielded bell located below the bridge;

wherein the bridge includes a first pair of spaced-apart rails for supporting the canister trolley and a second pair of spaced-apart rails for supporting the shielded bell trolley;

wherein the first pair of spaced-apart rails is parallel to the second pair of spaced-apart rails;

wherein the stationary spaced-apart rails are perpendicular to the first pair of spaced-apart rails and the second pair of spaced-apart rails;

wherein the canister trolley is configured to selectively move along the bridge relative to the shielded bell trolley, and wherein the shielded bell trolley is configured to selectively move along the bridge relative to the canister trolley;

wherein the canister trolley and the shielded bell trolley are configured to selectively move together along the bridge at the same time while the hoist of the canister trolley supports the spent fuel canister within the shielded bell carried by the shielded bell trolley; and wherein the load path of the shielded bell does not pass through the canister trolley and the load path of the shielded bell does not pass through the hoist.

17. The bridge crane according to claim 16, wherein the shielded bell trolley includes paddles receiving trunnions of the shielded bell to support the shielded bell.

18. The bridge crane according to claim 16, wherein the hoist includes a remote grapple attachment configured for selectively interlocking with the shielded bell.

* * * * *